United States Patent
Chiu et al.

(10) Patent No.: US 11,979,593 B2
(45) Date of Patent: May 7, 2024

(54) METHOD AND APPARATUS FOR VIDEO CODING WITH OF LOW-PRECISION FLOATING-POINT OPERATIONS

(71) Applicant: MEDIATEK INC., Hsinchu (TW)

(72) Inventors: Shih-Chun Chiu, Hsinchu (TW);
Tzu-Der Chuang, Hsinchu (TW);
Ching-Yeh Chen, Hsinchu (TW);
Chun-Chia Chen, Hsinchu (TW);
Chih-Wei Hsu, Hsinchu (TW);
Yu-Wen Huang, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 197 days.

(21) Appl. No.: 17/728,392

(22) Filed: Apr. 25, 2022

(65) Prior Publication Data

US 2023/0345029 A1    Oct. 26, 2023

(51) Int. Cl.
| | | |
|---|---|---|
| *H04N 7/12* | (2006.01) | |
| *G06T 3/02* | (2024.01) | |
| *H04N 19/117* | (2014.01) | |
| *H04N 19/136* | (2014.01) | |
| *H04N 19/139* | (2014.01) | |

(Continued)

(52) U.S. Cl.
CPC .............. *H04N 19/463* (2014.11); *G06T 3/02* (2024.01); *H04N 19/117* (2014.11); *H04N 19/136* (2014.11); *H04N 19/139* (2014.11); *H04N 19/172* (2014.11); *H04N 19/184* (2014.11); *H04N 19/52* (2014.11); *H04N 19/635* (2014.11); *H04N 19/82* (2014.11)

(58) Field of Classification Search
CPC ........................... H04N 19/635; G06T 3/0006
See application file for complete search history.

(56) References Cited

U.S. PATENT DOCUMENTS 11,290,711 B2    3/2022    Lin et al.
11,800,140 B2   10/2023    Xiu et al.
(Continued)

FOREIGN PATENT DOCUMENTS

| CN | 113545067 A | 10/2021 |
| CN | 113728645 A | 11/2021 |
| TW | 202021368 A | 6/2020 |

OTHER PUBLICATIONS

Chinese language office action dated Oct. 18, 2023, issued in application No. TW 111133328.

*Primary Examiner* — Y Lee
(74) *Attorney, Agent, or Firm* — McClure, Qualey & Rodack, LLP

(57) ABSTRACT

Method and apparatus for affine CPMV or ALF refinement are mentioned. According to this method, statistical data associated with the affine CPMV or ALF refinement are collected over a picture area. Updated parameters for the affine CPMV refinement or the ALF refinement are then derived based on the statistical data, where a process to derive the updated parameters includes performing multiplication using a reduced-precision multiplier for the statistical data. The reduced-precision multiplier truncates at least one bit of the mantissa part. In another embodiment, the process to derive the updated parameters includes performing reciprocal for the statistical data using a lookup table with (m−k)-bit input by truncating k bits from the m-bit mantissa part, and contents of the lookup table includes m-bit outputs. m and k are positive integers.

4 Claims, 4 Drawing Sheets

(51) Int. Cl.
*H04N 19/172* (2014.01)
*H04N 19/184* (2014.01)
*H04N 19/463* (2014.01)
*H04N 19/52* (2014.01)
*H04N 19/635* (2014.01)
*H04N 19/82* (2014.01)

(56) References Cited

U.S. PATENT DOCUMENTS

2022/0150506 A1   5/2022  Luo et al.
2023/0388531 A1* 11/2023  Makeev ................ G06F 17/16

\* cited by examiner

METHOD AND APPARATUS FOR VIDEO CODING WITH OF LOW-PRECISION FLOATING-POINT OPERATIONS

FIELD OF THE INVENTION

The present invention relates to video coding system. In particular, the present invention relates to large data range issue in optimizing parameters for the affine CPMV refinement or the ALF refinement during encoding process.

BACKGROUND

Versatile video coding (VVC) is the latest international video coding standard developed by the Joint Video Experts Team (WET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1 illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1, Loop filter 130 is applied to the reconstructed video before the reconstructed samples are stored in the reference picture buffer 134. The system in FIG. 1 is intended to illustrate an exemplary structure of a typical video encoder. It may correspond to the High Efficiency Video Coding (HEVC) system, VP8, VP9, H.264 or VVC.

The decoder can use similar or part of the same functional blocks as the encoder except for Transform 118 and Quantization 120 since the decoder only needs Inverse Quantization 124 and Inverse Transform 126. Instead of Entropy Encoder 122, the decoder uses an entropy decoder to decode the video bitstream into quantized transform coefficients and needed coding information. Furthermore, the decoder only needs to perform motion compensation instead of motion estimation/motion compensation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. For example, affine motion estimation is adopted by the VVC standard. The affine motion estimation and ALF are briefly reviewed as follows.

Affine Model

Motion occurs across pictures along temporal axis can be described by a number of different models. Assuming A(x, y) be the original pixel at location (x, y) under consideration, A' (x', y') be the corresponding pixel at location (x', y') in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$$x' = Ax + By + C \quad (1a)$$

$$y' = Dx + Ey + F \quad (1b)$$

In addition, a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = Ax + By + E \\ y' = -Bx + Ay + F \\ vx = x - x' \\ vy = y - y' \end{cases} \overset{\Delta}{\Longrightarrow} \begin{cases} vx = (1-A)x - By - E \\ vy = (1-A)y + Bx - F \end{cases} \quad (2)$$

The motion vector field of each point in this moving block can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad (3)$$

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block.

The six-parameter affine model uses 3 control points ($\vec{v}_0$, $\vec{v}_1$ and $\vec{v}_2$) as shown in FIG. 2, where block 210 corresponds to a current PU. The six-parameter affine motion model is capable of transforming a rectangle into a parallelogram 220. When an affine motion block is moving, the motion vector field of the block can be described by three control point motion vectors or six parameters as follows, where (vx, vy) represents the motion vector When the MVs ($v_0$ and $v_1$) of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

When the MVs ($v_0$, $v_1$ and $v_2$) of three control points are decoded, the MV of each 4×4 block can be derived according to the following equation:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad (4)$$

For six-parameter affine model in equations (1a) and (1b), the encoder may need to adjust the parameters in order to improve performance by reducing distortion. For example, if the parameters are changed to (A+a, B+b, C+c, D+d, E+e, F+f) respectively; the new affine model becomes:

$$x''=(A+a)x+(B+b)y+(C+c)=x'+ax+by+c \quad (5a)$$

$$y''=(D+d)x+(E+e)y+(F+f)=y'+dx+ey+f \quad (5b)$$

In order to improve the performance, the encoder may refine the model parameters by adjusting (a, b, c, d, e, f) to achieve a smaller distortion, such as MSE (mean squared error):

$$MSE = \sum_{(x_0,y_0) \in B} \|Org(x, y) - I(x'', y'')\|^2 = \quad (6)$$

$$\sum_B \|Org(x, y) - I(x' + ax + by + c, y' + dx + ey + f)\|^2$$

In the above equation, B is the current block, Org is the original signal, I is the prediction. In the above equation, I(x'+ax+by+c,y'+dx+ey+f) can be approximated from I(x',y') using Taylor expansion:

$$MSE = \sum_B \quad (7)$$

$$\|Org(x, y) - (I(x', y') + I'_x(x, y)(ax + by + c) + I'_y(x, y)(dx + ey + f))\|^2$$

$$= \sum_B \|E - (I'_x c + xI'_x a + I'_y f + xI'_y d + yI'_x b + yI'_y e)\|^2$$

In the above equation, $I_x'$ is the partial derivative of I with respect to x, $I_y'$ is the partial derivative of I with respect to y, and E=Org(x, y)−I(x', y').

Affine CPMV (Control Point Motion Vector) Refinement Process

In the following, an example of affine model refinement process using a 6-parameter affine model is described.

Let $\vec{m} = [c\ a\ f\ d\ b\ e]^T$, $\vec{k} = [I_x'\ xI_x'\ I_y'\ xI_y'\ yI_x'\ yI_y']^T$.

To find the optimal parameter adjustment $\vec{m}$ that leads to lowest MSE, take the gradient of MSE with respect to $\vec{m}$:

$$\frac{dMSE}{d\vec{m}} =$$

$$\frac{d}{d\vec{m}}\sum_B \|E - \vec{k}^T\vec{m}\|^2 = 0 \Rightarrow \sum_B -2\vec{k}(E - \vec{k}^T\vec{m}) = 0 \Rightarrow \sum_B \vec{k}\vec{k}^T\vec{m} = \sum_B \vec{k}E$$

Therefore, in the encoding algorithm, we collect the current distortion E and gradient information of current predictor $I_x'$ and $I_y'$, in one block, B first.

Accordingly, minimization of MSE becomes solving the equation $\Sigma_B \vec{k}\vec{k}^T\vec{m} = \Sigma_B \vec{k} E$. In this equation, $\vec{k}\vec{k}^T$ is a 6×6 matrix, $\vec{k}$ and $\vec{m}$ is 6-entry vectors and E is a scalar.

To estimate the data range required for the affine model refinement, the data ranges for related data in the MSE minimization are evaluated as follows:

The predictor image gradients $I_x'$ and $I_y'$ are derived by calculating the differences between pixels and they are at most 12 bits (assuming pixel values are 10 bits).

Pixel position x and y are at most 7 bits (assuming the largest PU is 128×128)

Vector $\vec{k}$ requires at most 12+7=19 bits for one sample

Matrix $\vec{k}\vec{k}^T$ requires at most 19+19=38 bits for one sample

The statistics should be collected over a block (PU): $\Sigma_B$ $\vec{k}\vec{k}^T$ requires at most 38+14=52 bits (assuming the largest PU is 128×128=$2^{14}$)

Assume the gradients are 0; in this extreme case, the collected statistics are also 0. Therefore, the data ranges from 0 to about $2^{52}$, which is extreme large. Therefore, it is desirable to develop operations that requires lower precisions for Affine CPMV.

In VVC, an Adaptive Loop Filter (ALF) with block-based filter adaption is applied. For the luma component, one among 25 filters is selected for each 4×4 block, based on the direction and activity of local gradients. Two diamond filter shapes are used as shown in FIG. 3. The 7×7 diamond shape (310) is applied for the luma component and the 5×5 diamond shape (310) is applied for the chroma components. VVC standard also supports Cross component adaptive loop filter (CCALF), that uses luma sample values to refine each chroma component by applying an adaptive.

The ALF reconstruction follows the equation:

$$rec\ after\ ALF = rec\ before\ ALF + \sum_c (n_c f_c)$$

where c is the number of coefficients (luma: 12, chroma: 6, CCALF: 7), $n_c$ is the neighboring information derived from rec before ALF and its neighboring samples, and $f_c$ is ALF filter coefficient.

The distortion is defined as ssd=(org−(rec+$\Sigma_c(n_c f_c)$))$^2$, and the total distortion is:

$$\sum_p (org_p - rec_p)^2 - 2\sum_c \left(\sum_p (org_p - rec_p)n_{pc}\right) f_c +$$

$$\sum_{ci}\sum_{cj}\left(\sum_p n_{pci} n_{pcj}\right) f_i f_j = pixAcc - 2\sum_c y[c]f_c + \sum_{ci}\sum_{cj} E[ci][cj] f_i f_j$$

In the above equation, pixAcc is the original distortion, y[c] is the cross-correlation matrix and E[ci][cj] is auto-correlation matrix.

These 3 types of statistics are summed over all samples (i.e., p) and collected in advance. In other words, the following ALF statistics are calculated:

pixAcc=$\Sigma_p$(org$_p$−rec$_p$)$^2$: original distortion y[c]=$\Sigma_p$(org$_p$−rec$_p$)n$_{pc}$: cross-correlation matrix E[ci][cj]=$\Sigma_p n_{pci} n_{pcj}$: auto-correlation matrix The bit depth required for the ALF coefficient adjustment is analyzed as follows:
 org$_p$ and rec$_p$ are pixel values: 10 bits
 n$_{pc}$ is the neighboring information derived by calculating the differences between pixels:
 12 bits
The required bits for pixAcc, y[c], and E[ci][cj] are 12+12=24 bits For ALF CTU (coding tree unit) mode decision, we need to collect ALF statistics over an entire CTU: 24+14=38 bits (assuming CTU size is 128×128).

For ALF slice mode decision, we need to collect over the entire picture: 38+9=47 bits (assuming 4K sequence is used, which contains 510≈2$^9$ CTUs per picture)

Assume the neighboring differences are 0; in this extreme case, the collected statistics are also 0. Therefore, the data ranges from 0 to about 2$^{47}$, which is extreme large. Therefore, it is desirable to develop operations that requires lower precisions for ALF.

BRIEF SUMMARY OF THE INVENTION

A method and apparatus for video encoding system that utilizes reduced-precision floating point multiplication are disclosed. According to this method, input data associated with a picture area in a current picture are received. Statistical data associated with affine CPMV (Control-Point Motion Vector) refinement or ALF (Adaptive Loop Filter) refinement are collected over the picture area. The picture area may correspond to a PU in the case of affine CPMV refinement and the picture area may correspond to a CTU or a whole picture in the case of ALF refinement. Updated parameters for the affine CPMV refinement or the ALF refinement are then derived based on the statistical data collected over the picture area, where the statistical data are represented in a floating-point format with a mantissa part in a first precision, and a process to derive the updated parameters comprises performing multiplication using a reduced-precision multiplier for the statistical data. The reduced-precision multiplier truncates at least one bit of the mantissa part. The reduced-precision multiplier truncates said at least one bit of the mantissa part according to a floor function, a rounding function, or a ceiling function.

According to another method, the process to derive the updated parameters comprises performing reciprocal for the statistical data using a lookup table with (m−k)-bit input by truncating k bits from the m-bit mantissa part, and contents of the lookup table comprises m-bit outputs, m and k are positive integers. Furthermore, the process to derive the updated parameters comprises performing multiplication using a reduced-precision multiplier for the statistical data, and wherein the reduced-precision multiplier truncates at least one bit of the m-bit mantissa part.

DETAILED DESCRIPTION OF THE INVENTION

Figure 1:
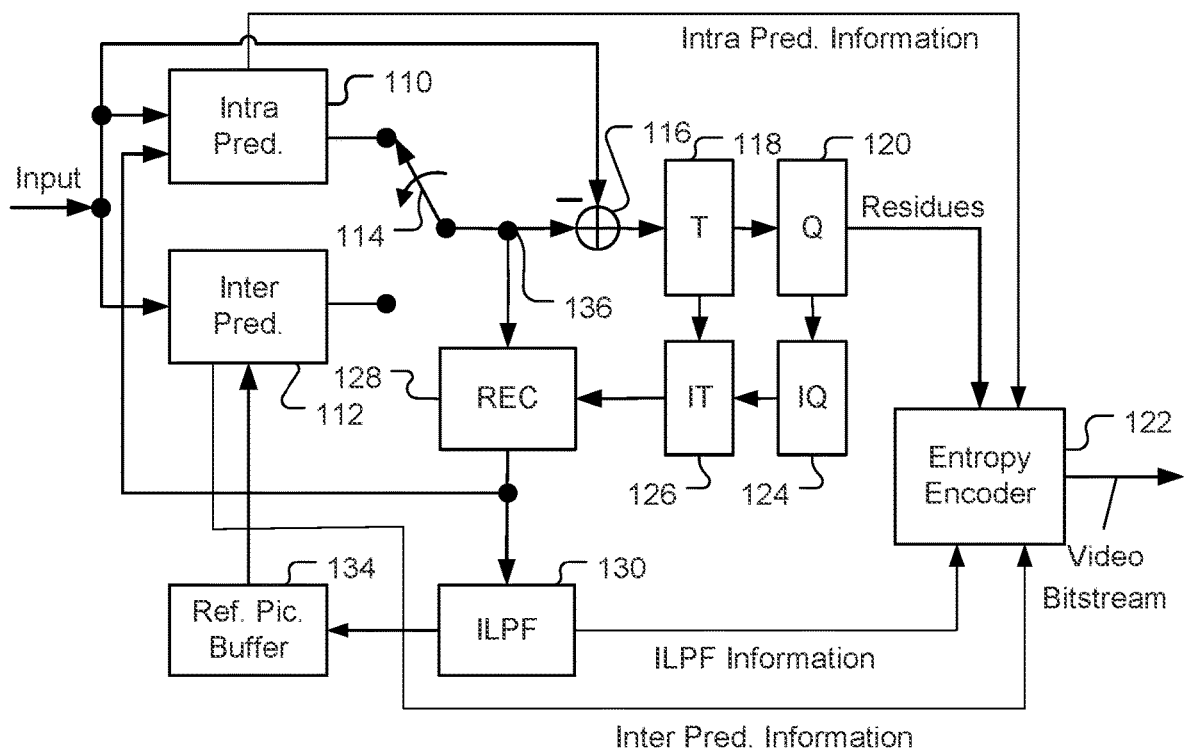
FIG. 1 illustrates an exemplary adaptive inter/intra video encoding system.
Figure 2:
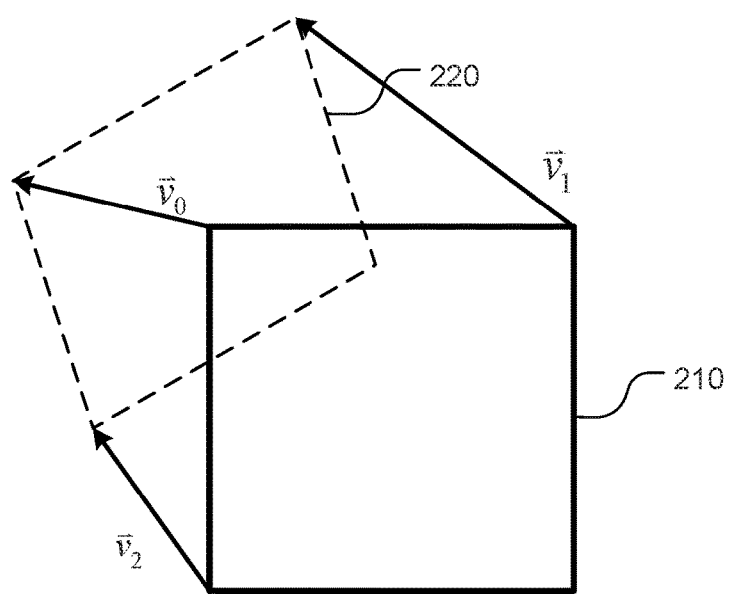
FIG. 2 illustrates an example of six-parameter affine model that uses 3 control points ($\vec{v}_0$, $\vec{v}_1$ and $\vec{v}_2$).
Figure 3:
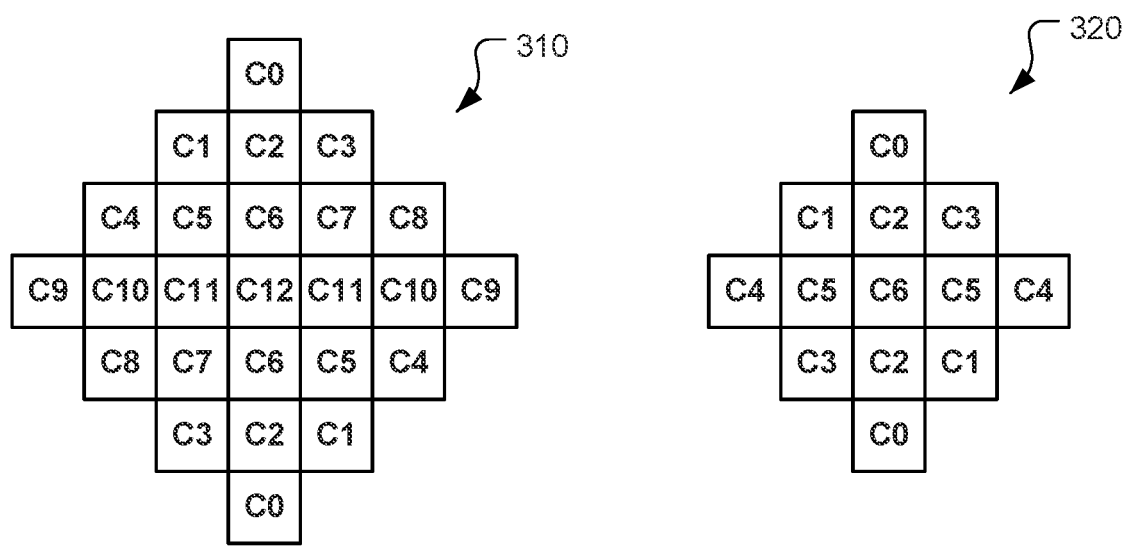
FIG. 3 shows the two diamond filter shapes used in the VVC standard, where the 7×7 diamond shape is applied for the luma component and the 5×5 diamond shape is applied for the chroma components.

The following description is of the best-contemplated mode of carrying out the invention. This description is made for the purpose of illustrating the general principles of the invention and should not be taken in a limiting sense. The scope of the invention is best determined by reference to the appended claims.

Floating-Point (FP) is arithmetic using formulaic representation of real numbers as an approximation to support a trade-off between range and precision. Floating-point computation is widely used in computing systems as well as signal processing systems such as video and audio encoders/decoders. According to floating-point arithmetic, a number is represented approximately with a fixed number of significant digits (referred as the significand or mantissa) and scaled using an exponent in some fixed base. In addition, a sign bit is used for represent the sign part of the number. While the base for the scaling can be two or ten, the base of two is often used in computing systems and signal processing systems. A number that can be represented is of the following form:

value=(−1)$^{sign}$×(1·mantissa)×2$^{exponent-(2^{e-1}-1)}$ where the mantissa is represented in m bits and the exponent is represented in e bits.

Given two floating-point numbers with m-bit mantissa, to calculate the multiplication of the two number will require a (m+1)-bit×(m+1)-bit multiplier for the mantissa part.

The multiplication of two floating-point numbers, a and b, can be performed as follows:

c=a*b sign$_c$=sign$_a$ XOR sign$_b$ prod=(1<<m+mantissa$_a$)*(1<<m+mantissa$_b$)

carry-in=(prod>>(2m+1))

$$\text{exponent}_c = \text{exponent}_a + \text{exponent}_b + \text{carry-in} - (2^{e-1}-1)$$

$$\text{mantissa}_c = \text{carry-in?prod}[2m:m+1]: \text{prod}[2m-1:m]$$

In the above equations, prod[2m:m+1] means the bit positions of prod from the $(2m)^{th}$ bit to the $(m+1)^{th}$ bit inclusive and prod[2m−1:m] means the bit positions of prod from the $(2m-1)^{th}$ bit to the $m^{th}$ bit inclusive. Another more computational intensive floating-point operation is the reciprocal. The reciprocal of a floating-point number a can be calculated as:

$$c = 1/a$$

$$\text{sign}_c = \text{sign}_a$$

$$\text{exponent}_c - (2^{e-1}-1) = 1 - (\text{exponent}_a - (2^{e-1}-1)$$

$$\text{mantissa}_c = (1<<(2m+1))/((1<<m) + \text{mantissa}_a) - (1<<m))$$

Special case: $\text{mantissa}_a = 0$

In practice, the mantissa part of the reciprocal may be implemented using a lookup table with m bits as the table input and the table outputs an m-bit data.

The division of a floating-point number a by another floating-point number b can be calculated as:

$$c = a/b$$

step 1: Derive 1/b using reciprocal operation
step 2: Derive a*(1/b) using multiplication operation Low Precision Floating-Point Operations
Low Precision Floating-Point Multiplication In the present application, a method of low precision floating-point multiplication is disclosed. According to embodiments of the present invention, the multiplication of the mantissa parts of floating-point numbers, a and b, using reduced precision by truncating k bits from the mantissa part, where k is an integer greater than 0. In other words, the reduced-precision floating-point multiplication only requires a (m−k+1)-bit×(m−k+1)-bit multiplier.

The multiplication process according to the present invention is described as follows:

$$c = a*b$$

$$\text{sign}_c = \text{sign}_a \text{ XOR sign}_b$$

$$\text{prod} = (1<<m+\text{mantissa}_a)">>k"*(1<<m+\text{mantissa}_b) ">>k"$$

$$\text{carry-in} = (\text{prod}>>(2m"-2k"+1))$$

$$\text{exponent}_c = \text{exponent}_a + \text{exponent}_b + \text{carry-in} - (2^{e-1}-1)$$

$$\text{mantissa}_c = \text{carry-in?prod}[2m"-2k":m"-2k"+1]:\text{prod}[2m"-2k"-1:m"-2k"]$$

"If k>m/2, pad 0s for mantissa$_c$ (prod bits will be insufficient)"

The low precision floating-point multiplication process is modified from the multiplication process with the regular full precision floating-point multiplication process. The differences are shown with a pair of quotation marks (i.e., " ") to indicate the inserted texts.

For example, if the full-precision floating point number uses 6-bit mantissa, the full-precision floating point multiplier will use a (6+1)-bit×(6+1)—bit multiplier, i.e., 7-bit× 7-bit multiplier. The multiplier for the full-precision floating-point multiplier will calculate a 13-bit or 14-bit product, $p_{13}p_{12}p_{11}p_{10}p_9p_8p_7p_6p_5p_4p_3p_2p_1p_0$, for mantissa of input a (i.e., $1a_5a_4a_3a_2a_1a_0$) and mantissa of input b (i.e., $1b_5b_4b_3b_2b_1b_0$). However, the multiplier will output a 7-bit result corresponding to $p_{13}p_{12}p_{11}p_{10}p_9p_8p_7$. If k=2 (i.e., 2 bits truncated) is selected for the low-precision floating point multiplier, i.e., a (4+1)-bit×(4+1)-bit multiplier. The low-precision floating point multiplier will use only 4 bits of the mantissa part. In other words, 2 bits (k=2) of the mantissa parts of a and b will be truncated. Therefore, $1a_5a_4a_3a_200$ and $1b_5b_4b_3b_200$ will be used by the low-precision floating point multiplier. The conversion from 6-bit precision to 4-bit precision can be any truncation function, such as floor( ), round( ) or ceil( ). The low-precision floating point multiplier will generate a 9-bit or 10-bit result, $p_{13}p_{12}p_{11}p_{10}p_9p_8p_7p_6p_5p_40000$. Again, the multiplier will output a 7-bit result corresponding to $p_{13}p_{12}p_{11}p_{10}p_9p_8p_7$.

Low-Precision Floating-Point Reciprocal (Division)

In the present application, a method of low precision floating-point reciprocal is disclosed. According to embodiments of the present invention, the low-precision floating-point reciprocal uses reduced-precision mantissa. For example, if the mantissa is reduced by k bits (k>0), the low-precision floating-point reciprocal operation becomes:

$$c = 1/a$$

$$\text{sign}_c = \text{sign}_a$$

$$\text{exponent}_c - (2^{e-1}-1) = 1 - (\text{exponent}_a - (2^{e-1}-1)$$

$$\text{mantissa}_c = (1<<(2m"-k"+1))/((1<<m)+\text{mantissa}_a) ">>k"-(1<<m))$$

Special case: $\text{mantissa}_a = 0$

The low precision floating-point reciprocal process is modified from the reciprocal process with the regular full precision floating-point reciprocal process. The differences are shown with a pair of quotation marks (i.e., " ") to indicate the inserted texts in the above equation.

In practice, we can use a reduced look-up table which take (m−k) bits as input and returns an m-bit result.

For example, if the full-precision floating point number uses 6-bit mantissa, the full-precision floating point reciprocal will use a 6-bit table input and each table entry stores a 6-bit output. For an input a, the 6-bit mantissa (i.e., $a_5a_4a_3a_2a_1a_0$) is used to access the lookup table. Each table entry stores a corresponding reciprocal output, $c_5c_4c_3c_2c_1c_0$. If k=2 is selected for the low-precision floating point reciprocal, the low-precision floating point reciprocal will use a 4-bit lookup table according to $a_5a_4a_3a_2$ to access the table contents and each table entry stores a corresponding reciprocal output, $c_5c_4c_3c_2c_1c_0$.

For low-precision floating-point division of a/b, it can be implement in two steps by computing the reciprocal (1/b) first using a smaller lookup table to obtain an output value with full precision mantissa. We then calculate the multiplication of a and (1/b) using low-precision floating-point multiplication with a reduced-precision multiplier.

The present invention can greatly reduce the video encoder complexity for optimization during Affine CPMV refinement or ALF refinement. In the bit depth estimation example for 10-bit pixel data and PU size of 128×128 during Affine CPMV refinement, the data range of collected statistics, $\Sigma_B \vec{k}\vec{k}^T \vec{m}$, could be between 0 and $2^{52}$. Solving the final equation is $\Sigma_B \vec{k}\vec{k}^T \vec{m} = \Sigma_B \vec{k} E$ to derive the optimal parameters for Affine CPMV refinement would require to perform floating-point multiplication, reciprocal or division at such high precision. However, the present invention allows floating-point multiplication, reciprocal or division operations performed using a multiplier or a lookup table at reduced precision for the mantissa part. For example, instead of a (52+1)-bit×(52+1)-bit multiplier, a (24+1)-bit×(24+1)-bit reduced-precision multiplier can be used for Affine CPMV refinement. In the bit depth estimation example for 10-bit pixel data and 4k picture during ALF refinement, the data range of collected statistics could be between 0 and $2^{47}$. Again, the present invention allows floating-point multiplication, reciprocal or division operations performed using a multiplier or a lookup table at reduced precision for the mantissa part. For example, instead of a (47+1)-bit×(47+1)-bit multiplier, a (24+1)-bit×(24+1)-bit reduced-precision multiplier can be used for ALF refinement.

An encoder incorporating an embodiment of the present invention may use the low-precision floating-point multiplication/division for the Affine CPMV, where the low-precision floating-point multiplication/division is used to collect the statistics and to derive the affine model parameters as described above. The Affine CPMV encoding process according to one embodiment of the present invention can be incorporated in the Inter Prediction 112 to reduce the required complexity. An encoder incorporating an embodiment of the present invention may use the low-precision floating-point multiplication/division for the ALF, where the low-precision floating-point multiplication/division is used to collect the statistics and to derive the parameters for the ALF as described above. The ALF encoding process according to one embodiment of the present invention can be incorporated in the ILPF 130 to reduce the required complexity.

Figure 4:
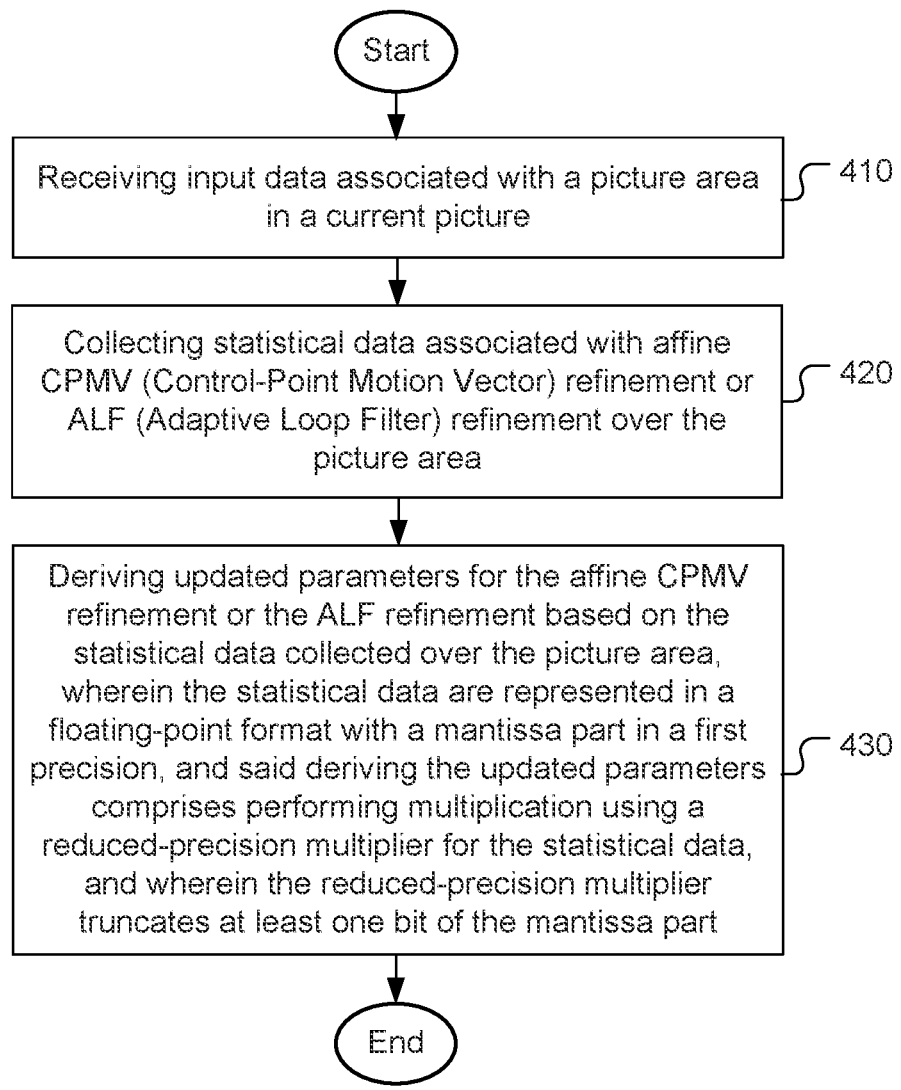
FIG. 4 illustrates a flowchart of an exemplary video encoding system that utilizes reduced-precision floating point multiplication according to an embodiment of the present invention.

FIG. 4 illustrates a flowchart of an exemplary video encoding system that utilizes reduced-precision floating-point multiplication according to an embodiment of the present invention. According to this method, input data associated with a picture area in a current picture are received in step 410. Statistical data associated with affine CPMV (Control-Point Motion Vector) refinement or ALF (Adaptive Loop Filter) refinement are collected over the picture area in step 420. The picture area may correspond to a PU in the case of affine CPMV refinement and the picture area may correspond to a CTU or a whole picture in the case of ALF refinement. Updated parameters for the affine CPMV refinement or the ALF refinement are then derived based on the statistical data collected over the picture area in step 430, where the statistical data are represented in a floating-point format with a mantissa part in a first precision, and a process to derive the updated parameters comprises performing multiplication using a reduced-precision multiplier for the statistical data. The reduced-precision multiplier truncates at least one bit of the mantissa part.

Figure 5:
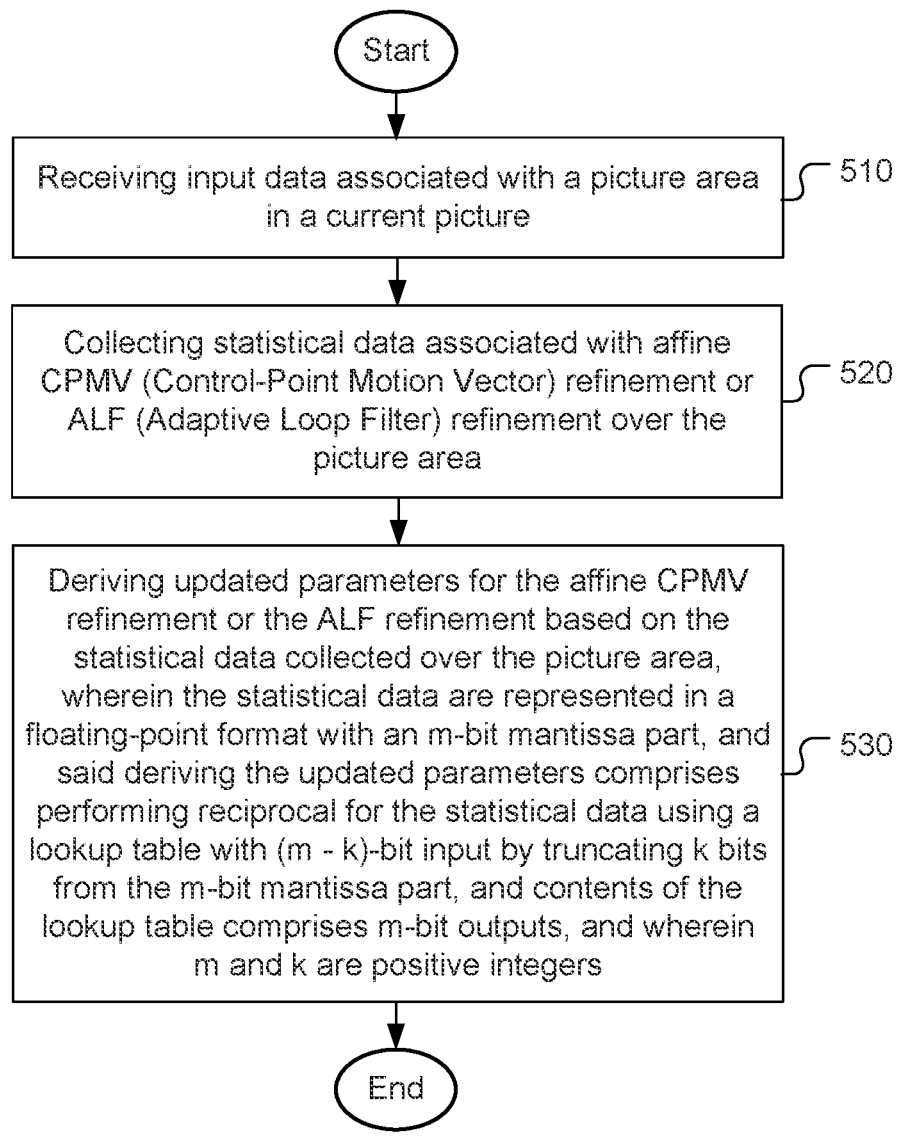
FIG. 5 illustrates a flowchart of an exemplary video encoding system that utilizes reduced-precision floating-point reciprocal according to an embodiment of the present invention.

FIG. 5 illustrates a flowchart of an exemplary video encoding system that utilizes reduced-precision floating-point reciprocal according to an embodiment of the present invention. According to this method, input data associated with a picture area in a current picture are received in step 510. Statistical data associated with affine CPMV (Control-Point Motion Vector) refinement or ALF (Adaptive Loop Filter) refinement are collected over the picture area in step 520. The picture area may correspond to a PU in the case of affine CPMV refinement and the picture area may correspond to a CTU or a whole picture in the case of ALF refinement. Updated parameters for the affine CPMV refinement or the ALF refinement are then derived based on the statistical data collected over the picture area in step 530, where the statistical data are represented in a floating-point format with an m-bit mantissa part, and the process to derive the updated parameters comprises performing reciprocal for the statistical data using a lookup table with (m−k)-bit input by truncating k bits from the m-bit mantissa part, and contents of the lookup table comprises m-bit outputs. In the above, m and k are positive integers.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
receiving input data associated with a picture area in a current picture;
collecting statistical data associated with affine CPMV (Control-Point Motion Vector) refinement or ALF (Adaptive Loop Filter) refinement over the picture area; and
deriving updated parameters for the affine CPMV refinement or the ALF refinement based on the statistical data collected over the picture area, wherein the statistical data are represented in a floating-point format with a mantissa part in a first precision, and said deriving the updated parameters comprises performing multiplication using a reduced-precision multiplier with the statistical data, and wherein the reduced-precision multiplier truncates at least one bit of the mantissa part.

2. The method of claim 1, wherein the reduced-precision multiplier truncates said at least one bit of the mantissa part according to a floor function, a rounding function, or a ceiling function.

3. The method of claim 1, wherein the statistical data is used as a first multiplicand of the reduced-precision multiplier and the reduced-precision multiplier truncates at least one bit of the mantissa part for at least the first multiplicand of the reduced-precision multiplier.

4. An apparatus of video coding, the apparatus comprising one or more electronic circuits or processors arranged to:
receive input data associated with a picture area in a current picture;
collect statistical data associated with affine CPMV (Control-Point Motion Vector) refinement or ALF (Adaptive Loop Filter) refinement over the picture area; and
derive updated parameters for the affine CPMV refinement or the ALF refinement based on the statistical data collected over the picture area, wherein the statistical data are represented in a floating-point format with a mantissa part in a first precision, and a process to derive the updated parameters comprises performing multiplication using a reduced-precision multiplier with the statistical data, and wherein the reduced-precision multiplier truncates at least one bit of the mantissa part.

\* \* \* \* \*